(No Model.)
H. WETTSTEIN.
SCOOP OR SPOON MEASURE.
No. 356,514. Patented Jan. 25, 1887.
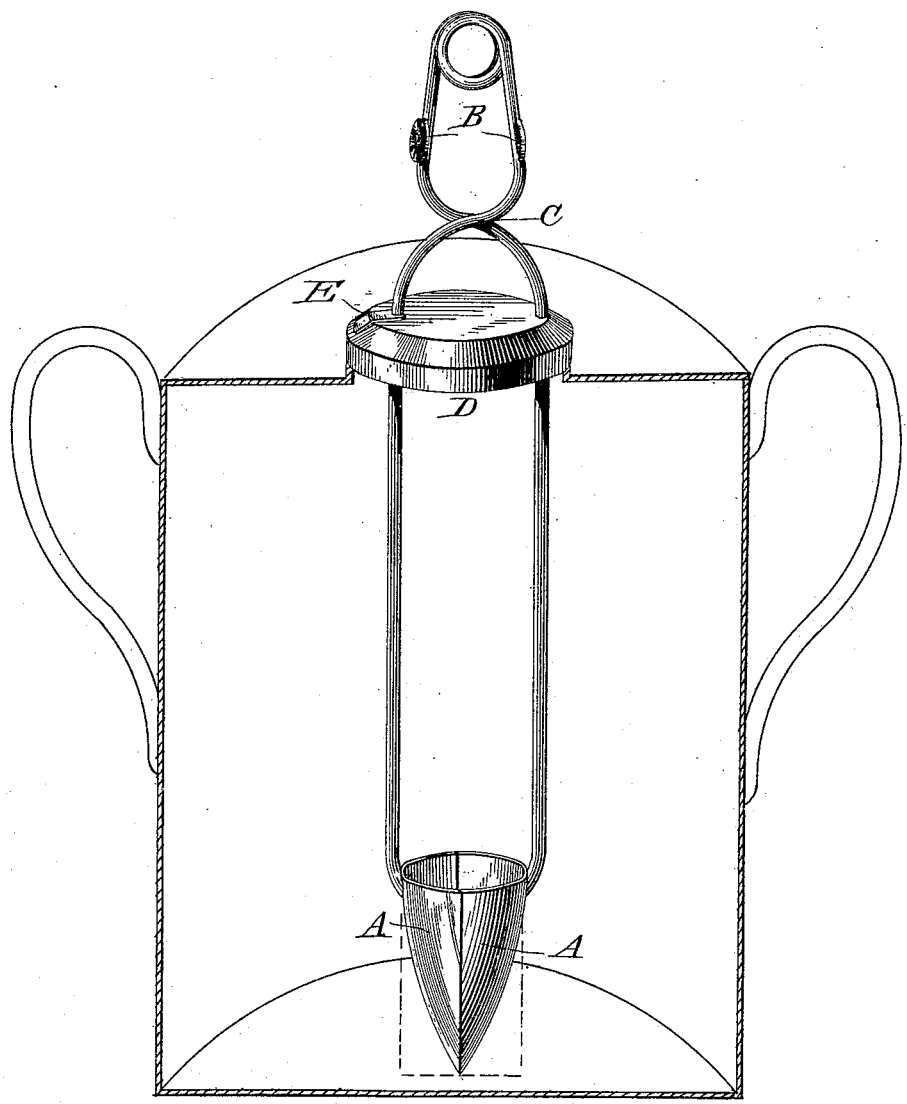
Witnesses:
Eugene Saunders.
H. L. Frederick.
Inventor:
Herman Wettstein.

UNITED STATES PATENT OFFICE.

HERMAN WETTSTEIN, OF HARVARD, ILLINOIS.

SCOOP OR SPOON MEASURE.

SPECIFICATION forming part of Letters Patent No. 356,514, dated January 25, 1887.

Application filed October 2, 1884. Serial No. 144,593. (No model.)

*To all whom it may concern:*

Be it known that I, HERMAN WETTSTEIN, a citizen of the United States, residing at Harvard, in the county of McHenry and State of Illinois, have invented certain new and useful Improvements in Scoop or Spoon Measures; and I do hereby declare the following to be a full, clear, and exact description of the invention, such as will enable others skilled in the art to which it appertains to make and use the same, reference being had to the accompanying drawing, and to the letters or figures of reference thereon, which form part of this specification.

My invention relates to a device for measuring and conveying liquids and small loose solid substances from one bowl or receptacle into another in an easy manner, and to provide a suitable covering for the same where required—such as cream or milk pitchers, sugar-bowls, or other receptacles containing liquid or solid food—the object being to exclude impurities and also flies and other insects and vermin therefrom; another object of the device being that it is so constructed that when the spoon or scoop is replaced into its proper receptacle the cover is placed thereon at the same time, where said scoop is used in combination with the cover.

The accompanying drawing represents a perspective of an implement embodying my invention.

A A are the spoon-bowls, scoops, or measures which hold the substance to be conveyed. These scoops may be of any desired material and of any shape, and may be made of such a size as to hold a certain desired quantity—as, for instance, a tea-spoonful of cream or sugar, or a pint of milk, or a quart of oil, or a peck of oats. For loose solid substances—such as sugar, rice, or wheat—they should taper downward, as shown in the drawing; but for liquids they may be flat at bottom. These two scoops, when pressed together at the edges facing each other, form one scoop or bowl, open at the top, at which the substance to be conveyed enters, filling the said scoop, spoon, or measure.

B is the handle of the device, formed so that each end constitutes an arm, said arms extending to the scoops A A, and being firmly attached thereto. These handles are of such length below the cover D that the lower end of the scoop may touch the bottom of the receptacle to which it belongs.

Handles B cross each other at C, which may be at any desired point between the scoops and the upper part of the handles B, said handles B forming a curve at their upper ends, which constitutes the handle proper of the device and furnishes the elasticity which draws the two scoops A A together, forming one bowl. By pressing the handles proper together said scoops A A will separate, allowing the contents to drop out.

Cover D is designed to close an opening in the top or main cover of the bowl or receptacle to which the scoop belongs, said cover or top being made to fit tightly to the receptacle, or being permanently attached thereto, said aperture in the top or main cover being designed to allow the filling of the bowl or receptacle and for receiving the device up to cover D, said cover D being designed to exclude flies and other vermin from the interior of the receptacle, and fitting loosely on the main cover or top of the receptacle.

Cover D may be permanently affixed to handles B near their upper part, as shown, or it may be made to slide up and down them, to adjust itself to bowls or receptacles of different depths.

One (or both) of the holes or cuts in cover D, made for the handles B to pass through, must be large or long enough to allow said handle B or one arm thereof free action therein while pressed together to separate the scoops A A. The opening thus made in cover D for the free action of the handles is closed by movable plate E, which is attached to the free or movable arm of the handle, drawing said plate E over the opening for the handles in cover D. When cover D slides up and down the handles, plate E must also be loose on arm to play up and down, so as always to rest on cover D to close the opening therein.

Reference is made in this application to the devices shown in my pending application filed October 4, 1868, Serial No. 146,868, but which are not there broadly claimed.

I am aware that spoons having spring-handles to keep them separated are old, and this I disclaim.

Having thus described my invention, what I claim as new, and desire to secure by Letters Patent, is—

1. The cover D, having one of the arms of handle B firmly attached to it, while the other arm plays within a slot in the cover, substantially as set forth.

2. The cover D, provided with a slot, in combination with the movable plate E, attached to the free arm of handle B, substantially as specified.

3. The cover D, adapted to slide up and down on the arms of handle B, in combination with plate E, adapted to slide up and down on the arm B, substantially as shown.

4. The combination of the scoops A and the handles B, crossing each other at C, with the sliding cover D and plate E, substantially as described.

5. The combination of a bowl or receptacle adapted to receive the scoops A and the lower parts of the handles B, the cover D, for closing the opening in said vessel, and the movable plate E, substantially as set forth.

In testimony whereof I hereby affix my signature in presence of two witnesses.

HERMAN WETTSTEIN.

Witnesses:
H. L. FREDERICK,
C. F. VIERCK.